United States Patent Office 2,935,486
Patented May 3, 1960

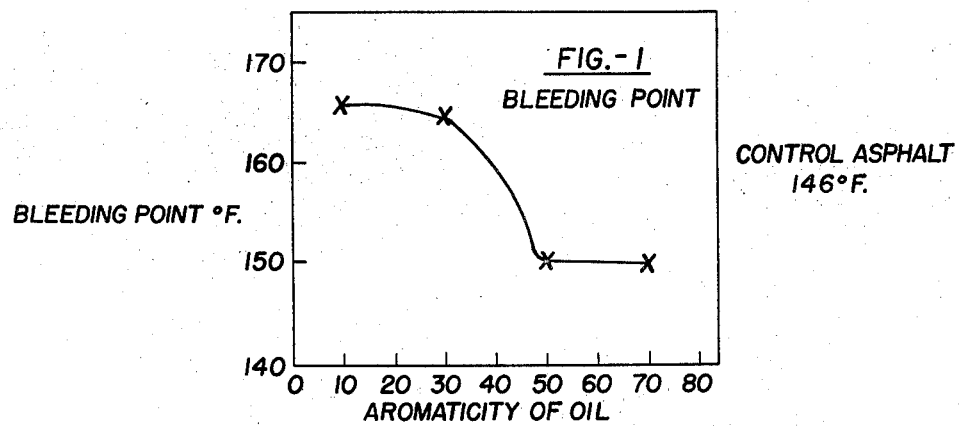
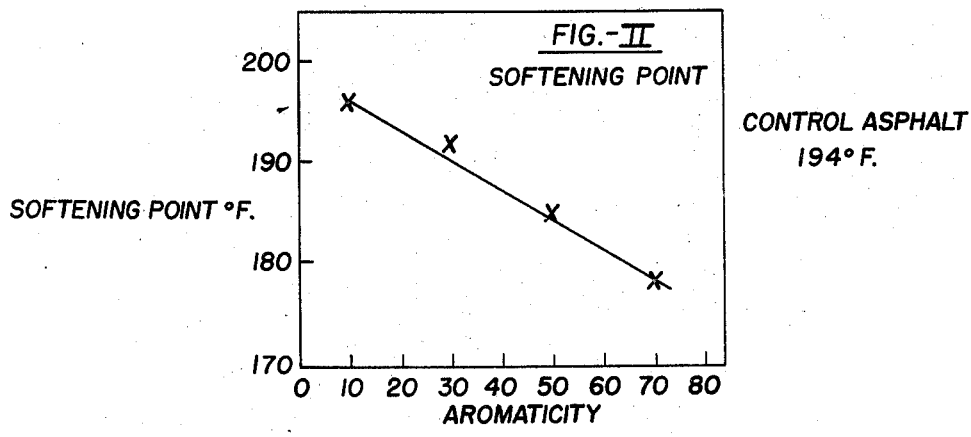
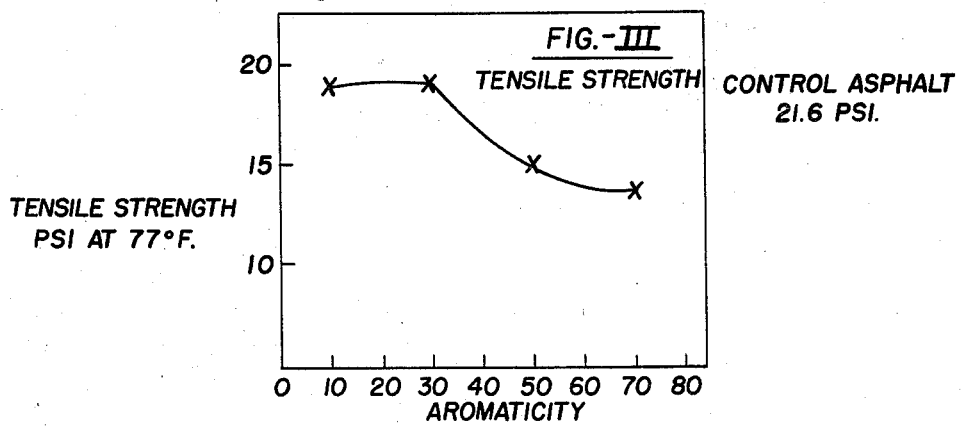
Andrew F. Sayko
Raymond G. Newberg — Inventors

2,935,486

ASPHALT, ISOBUTYLENE-STYRENE COPOLYMER, HYDROCARBON OIL ADHESIVE FOR LAMINATES

Andrew F. Sayko, Westfield, and Raymond G. Newberg, Roselle Park, N.J., assignors to Esso Research and Engineering Company, a corporation of Delaware Application July 5, 1955, Serial No. 519,803

5 Claims. (Cl. 260—28.5)

The present invention is concerned with an improved process for the preparation of high quality petroleum asphalts. The invention is more particularly concerned with a method for producing a high quality laminated sheet material utilizing asphalt, pitch, bitumen and the like as a basic element of the adhesive and water-proofing medium. In accordance with the present invention a small quantity of a copolymer of a polymerizable hydrocarbon containing a cyclic nucleus and an aliphatic olefin or alkene as, for example, a copolymer of styrene and isobutylene as described in U.S. 2,274,749, is used in conjunction with a critical quantity of an oil which is characterized by containing a relatively low concentration of aromatics.

It is known in the art to manufacture laminated paper or cardboard of two or more thicknesses cemented together by means of various hot melt materials such as asphalts. Other materials such as wood resins, mineral oils, bitumen, gelatine, resin soaps, gum-arabic, etc. may also be added to increase the adhesive power of the hot melt material. The hot melt material is usually applied to provide a coherent impervious and tough membrane between adjacent layers of the paper or cardboard. In the manufacture described a sufficient quantity of the hot melt material must be applied in order to provide a coherent layer to cement together the adjacent layers of material, and in addition give adequate waterproofing and moisture proofing properties.

The present invention provides an improved laminated sheet material or the like which is inexpensive to manufacture. The present invention is based upon the discovery that the addition of a small quantity of a certain type of hydrocarbon copolymer and a critical quantity of an oil of low aromatic content to an asphalt, preferably an oxidized asphalt, produces an excellent cement for use in the manufacture of laminated paper or for like purposes. The composition may be applied or used in small and economical quantities sufficient to enable the pitch, bitumen or like constituent to cement the laminations securely together. At the same time a waterproofing property is imparted to the product. The polymer and oil apparently function to retard or substantially prevent migration of the asphalt or the like into the paper or other absorbent material, thereby improving the low temperature flexibility of the laminate.

According to the invention, a laminated paper, cardboard or the like is characterized in that the laminations are united by an adhesive comprising an oxidized asphalt or the like to which has been added a small quantity of a copolymer of a polymerizable hydrocarbon containing a cyclic nucleus and an aliphatic olefin or alkene, for example, a copolymer of styrene and isobutylene as described in U.S. 2,274,749, to retard migration of the pitch or the like into the material together with an oil of low aromatic content.

Broadly, the present invention comprises using as the copolymer to be compounded with the bituminous material a copolymer of a cyclic alkene and a mono-olefin, which copolymer has an intrinsic viscosity greater than 0.7 and a content of combined styrene or other cyclic constituents of 20 to 80%, preferably 50%, such copolymers being produced at copolymerization temperatures below —50° C., and preferably below —70° C., a suitable operating temperature being —103° C., since this is the boiling point of liquefied ethylene. Copolymers having the desired high intrinsic viscosity cannot be produced at more elevated temperatures, such as between 0° C. and —50° C.

The intrinsic viscosity may be determined in a suitable solvent such as toluene, using the following formula:

$$\text{Intrinsic viscosity} = \frac{2.303 \log_{10} \text{relative viscosity}}{\text{concentration of copolymer/100 ml.}}$$

Instead of isobutylene, other aliphatic mono-olefins may be used. The compounds used preferably have more than 2 carbon atoms and are preferably iso-olefins having 4 to 8 carbon atoms, such as isopentene (methyl-2-butene-1) or a pentene obtained by dehydration of secondary amyl alcohol.

Instead of styrene, other polymerizable, mono-olefinic aromatic hydrocarbons may be used, such as indene, the homologues of styrene, e.g. alphamethyl styrene, paramethyl styrene, alphamethyl paramethyl styrene or dihydro naphthalene.

The copolymerization is effected by mixing the two reactants, with or without a mutual solvent such as ethylene, propane, butane, methyl chloride or refined naphtha, and then, after the cooling of the reactants to the desired low temperature, adding a Friedel-Crafts halide catalyst such as boron fluoride or boron fluoride catalyst activated by the addition of 0.1% of diethyl ether, aluminum chloride, titanium tetrachloride or aluminum alkoxide-aluminum chloride complex $(AlCl_3.Al(OC_2H_5)_3)$. If desired, such catalyst may be dissolved in a solvent such as carbon disulfide, a low molecular weight sulfur-free saturated hydrocarbon, a lower alkyl halide, e.g. methyl chloride, or ethyl chloride, or a mixture of methyl chloride with butane at or below the boiling point of the catalyst solvent, and then the catalyst solution cooled down, filtered and added to the reaction mixture. Alternative catalysts include:

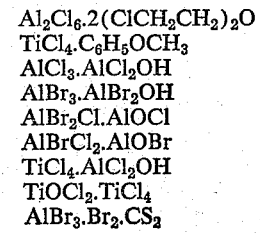

$Al_2Cl_6.2(ClCH_2CH_2)_2O$
$TiCl_4.C_6H_5OCH_3$
$AlCl_3.AlCl_2OH$
$AlBr_3.AlBr_2OH$
$AlBr_2Cl.AlOCl$
$AlBrCl_2.AlOBr$
$TiCl_4.AlCl_2OH$
$TiOCl_2.TiCl_4$
$AlBr_3.Br_2.CS_2$ $BF_3$ solution in ethylene, and activated $BF_3$ catalyst in methyl chloride solution. Volatile solvents or diluents, e.g. propane, ethane, ethylene, methyl chloride, alkyl halides, methylene chloride or carbon dioxide (liquid or solid) may also serve as internal or external refrigerants to carry off the liberated heat of polymerization. After completion of the copolymerization, residual catalyst is hydrolyzed with alcohol, for example, isopropanol and excess catalyst is removed by washing the product with water and preferably also with dilute aqueous caustic soda. The resulting solid copolymer may range from a viscous fluid or a relatively stiff plastic mass to a hard, tough thermoplastic resinous solid, depending upon the temperature of polymerization, the yield of polymer obtained upon the active feed, the type and concentration of catalyst, the proportion of cyclic reactant in the feed, and the temperature at which the physical texture is observed.

When copolymers are prepared according to this invention, using copolymerization temperatures below —50° C., the resultant products will generally have average molecular weights above 6,000, and preferably between 10,000 to 150,000, with intrinsic viscosities above 0.7 and preferably between 0.8 to 3.0. The higher molecular weight and intrinsic viscosities are obtained with the lower copolymerization temperatures, and they are also favored by the lower content of cyclic reactant, i.e., a combined styrene content of 20 to 40%. The hardness of the copolymer generally increases with increasing content of combined styrene or other cyclic constituents.

Thus, the preferred operating conditions for making the copolymers for use according to this invention, comprise copolymerizing a reaction mixture containing 20–80% of styrene and the balance isobutylene, at a temperature below —70° C. in the presence of about 1–4 volumes of methyl chloride or other lower alkyl halides per volume of active polymerization feed, using as the catalyst the solution of aluminum chloride dissolved in methyl chloride or other lower alkyl halides.

The bituminous material to be compounded with the above-described copolymer may be selected from a wide variety of natural and industrial products. For instance, various natural asphalts may be used such as natural Trinidad, Bermudez, gilsonite, grahamite and Cuban asphalts. Various petroleum asphalts may be used such as those obtained from a California crude or a Mid-Continental air blown oil. Mexican petroleum asphalt, as well as tarry residues known as cracking coal tar obtained as a by-product during the cracking of gas oil or other heavier petroleum fractions to obtain gasoline or other lighter fractions, may be used. Although the above mentioned natural and petroleum asphalts are preferred, still further bituminous materials may be used such as coal tar, wood tar and pitches obtained from various industrial processes, such as a fatty acid pitch.

The term "asphalt" as used in the present specification is intended to mean the asphaltic bitumen per se without any added dust, sand, gravel, etc., as commonly used in paving asphalt. The bitumen which is used according to the present invention, particularly if it is a petroleum asphalt, may have been subjected to any of the commonly used refining or treating processes, such as distillation, steam reduction, air blowing, etc. The invention is particularly advantageous in the case of oxidized asphalts because they are generally not as cementitious and ductile as the steam reduced asphalts. Furthermore, among the oxidized asphalts, the invention is of greater advantage with asphalt having a high softening point, particularly when used as a metal protecting coating composition. On the other hand, if a steam reduced or other brittle asphalt is to be subjected to cold temperatures, incorporation of some of the copolymer of high intrinsic viscosity according to this invention will greatly reduce the tendency of such an asphalt to crack when subjected to vibration or bending.

The invention may also be applied to the use of asphalt or other bituminous materials in a cut-back condition, i.e., dissolved in a volatile solvent such as kerosene, toluene, petroleum aromatic solvent fraction, benzene or petroline or also when emulsified with water, either in the form of an oil-in-water type emulsion or as a water-in-oil type emulsion.

The oil to be added is characterized by having a low aromatic content below about 30%, preferably below about 15% in order to secure the desired softening point. An oil free of aromatics is particularly desirable. The viscosity S.S.U. should be from about 50 to 500, preferably 80 to 300, at 100° F.

It is essential that the correct ratio of oil to polymer be employed. In general, the weight percent of oil present should be at least twice that of the polymer used, preferably in the range from 3.5 to 5.0 times the weight percent of oil present.

In general, the weight percent of polymer, based on the asphalt, incorporated into the asphalt should range from about 0.25 to about 10%, with the weight percent of oil incorporated varying from about 0.5 to 50%. Very desirable amounts are from about 4.0% to 5.0% of polymer, based on the asphalt, and from 3.5 to 5.0 times this amount of the oil of low aromatic content. The styrene content of the polymer should be in the range of from about 20% to 80%.

In order to further illustrate the invention the following examples are given:

EXAMPLE I

A number of hydrocarbon oils having viscosities between 50 and 500 S.U.S. at 100° F. and having various degrees of aromaticity were blended in a control asphalt together with a polymer containing 50% by weight of styrene.

| Hydrocarbon Oil | Percent Aromatics | Iodine No. |
|---|---|---|
| A | 12 | 9.2 |
| B | 30 | 25.0 |
| C | 50 | 40.0 |
| D | 70 | 55.0 |

The control asphalt had a bleeding point of 146° F.,[1] a softening point of 194° F. and a tensile strength of 21.6 p.s.i. 10% by weight of the hydrocarbon oil was used in conjunction with 5% by weight of the polymer containing 50% styrene. The results of these tests are shown in Figures 1, 2 and 3. In Figures 1 and 3 it is evident that the aromaticity of the oil should be below about 30% while Figure 2 demonstrates that if the softening point be critical the aromaticity should be below about 15%.

EXAMPLE II

A number of blends were made in accordance with the present invention and the kinematic viscosity cps. at 400° F. measured. The viscosity of the base asphalt of the unmodified asphalt was 116. In all instances it is very desirable that the viscosity of the blend be substantially that of the unmodified asphalt. The results of these tests are given in the following tables:

Table A

| Percent Polymer (50% Styrene) | Percent Oil | Satisfactory | Viscosity | Oil to Polymer Ratio |
|---|---|---|---|---|
| 0.5 | 0.5 | No | 165 | |
| 0.5 | 1.0 | No | 140 | |
| 0.5 | 1.5 | Yes | 125 | 3/1 |
| 0.5 | 2.0 | Yes | 116 | 4/1 |

Table B

| Percent Polymer (50% Styrene) | Percent Oil | Satisfactory | Viscosity | Oil to Polymer Ratio |
|---|---|---|---|---|
| 1.0 | 1.0 | No | 225 | |
| 1.0 | 2.0 | No | 170 | |
| 1.0 | 3.0 | No | 140 | |
| 1.0 | 4.0 | Yes | 116 | 4/1 |

---

[1] The bleeding test is run on the blocking bar which was developed for wax testing. It consists of an aluminum bar heated at one end and cooled at the other. Thus a temperature gradient exists across the bar. The samples are placed on this bar and exposed for 4 hours. When the samples are removed the point at which blocking or bleeding is first apparent is noted. Then from noting the temperature at the various points on a bar it is possible to select a bleeding temperature which is accurate within a few degrees.

Table C

| Percent Polymer (50% Styrene) | Percent Oil | Satisfactory | Viscosity | Oil to Polymer Ratio |
|---|---|---|---|---|
| 2.0 | 2.0 | No | 380 | |
| 2.0 | 3.0 | No | 325 | |
| 2.0 | 4.0 | No | 275 | |
| 2.0 | 5.0 | No | 225 | |
| 2.0 | 8.0 | No | 150 | |
| 2.0 | 9.0 | Yes | 116 | 4.5/1 |

Table D

| Percent Polymer (50% Styrene) | Percent Oil | Satisfactory | Viscosity | Oil to Polymer Ratio |
|---|---|---|---|---|
| 5.0 | 5.0 | No | 900 | |
| 5.0 | 10.0 | No | 425 | |
| 5.0 | 15.0 | No | 200 | |
| 5.0 | 18.0 | Yes | 116 | 3.6/1 |

Frm the above data it is evident that the amount of oil used as compared to the weight percent of polymer incorporated should be at least 2 and preferably in the range from about 3½ to 5 times the quantity of polymer used.

In carrying out the invention, the constituents may be compounded in any desired manner, but the preferred procedure will, of course, depend upon the relative proportions of the two primary constituents as well as the type and quantity of any other liquid or solid additives to be used. However, if a small amount of copolymer and oil is to be incorporated into a large amount of bituminous material without the use of any solvents, the asphalt or other bituminous materials may simply be melted, either by direct firing in a kettle by the use of steam coils or a steam jacket, and then the copolymer added to it with stirring either in the form of small solid pieces or chunks or in a molten or at least heat-softened condition. Another alternative in making such compositions is to make a master-batch of asphalt-copolymer of much higher copolymer content than desired in the finished mixture, for instance, by compounding one part of asphalt with 1 to 5 parts by weight of copolymer by gradually adding the heat-softened asphalt into the copolymer while the latter is being mechanically worked in a hot kneader or on hot steel rolls such as those used in the conventional rubber mill. The desired amount of such a master-batch may then readily be blended into a larger batch of molten asphalt.

In using the above cement for the manufacture of two-ply laminated kraft paper, a small quantity is applied to the face of a sheet by means of back filling rollers and doctor knives. Two sheets, one of which is coated, are then brought together and go through rollers providing a tight nip, which rollers may be heated or cold. The cement may be applied in quantity sufficient to yield the type laminate required as, for example, 30-30-30, 30-45-30, 45-30-45, 60-30-60, etc., in which the first and last figures represent the paper weight in pounds per ream of 24" x 36" paper and the middle figure, the pounds of adhesive applied to this quantity of paper.

The invention having been described, what is claimed is:

1. An improved asphaltic composition comprising an asphalt to which has been added from about 0.25% to about 10% by weight, based upon the asphalt, of a copolymer of from about 20 to about 80 wt. percent of styrene and about 80 to about 20 wt. percent of isobutylene, said copolymer having an intrinsic viscosity greater than 0.7 and having been prepared by copolymerization at temperatures below −50° C., and from about 300 to about 500 wt. percent, based upon the copolymer, of a hydrocarbon oil containing from 0 to 30 wt. percent aromatics and having a viscosity at 100° F. between about 50 and 500 Saybolt Universal seconds.

2. A composition as defined by claim 1 wherein said oil has a viscosity between about 80 and about 300 Saybolt Universal seconds at 100° F.

3. A composition as defined by claim 1 wherein said copolymer consists of about 50% styrene and 50% isobutylene.

4. A composition as defined by claim 1 containing about 350 to about 500 wt. percent of said oil, based upon said copolymer.

5. A composition as defined by claim 1 containing about 4 to about 5 wt. percent of said copolymer, based upon said asphalt.

References Cited in the file of this patent

UNITED STATES PATENTS

| 2,274,749 | Smyers | Mar. 3, 1942 |
| 2,802,798 | Smith | Aug. 13, 1957 |

FOREIGN PATENTS

| 927,636 | France | May 5, 1947 |

OTHER REFERENCES

Advances in Chemistry Series, Progress in Petroleum Technology, page 350 (Order from: Special Publication Dept. American Chemical Society, 1155 16th Street, N.W., Washington 6, D.C.).